US010378897B2

(12) United States Patent
Jovicic et al.

(10) Patent No.: US 10,378,897 B2
(45) Date of Patent: Aug. 13, 2019

(54) DETERMINATION OF POSITIONING INFORMATION OF A MOBILE DEVICE USING MODULATED LIGHT SIGNALS

(71) Applicant: QUALCOMM Incorporated, San Diego, CA (US)

(72) Inventors: Aleksandar Jovicic, Jersey City, NJ (US); Thomas J. Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 795 days.

(21) Appl. No.: 13/923,908

(22) Filed: Jun. 21, 2013

(65) Prior Publication Data

US 2014/0375982 A1  Dec. 25, 2014

(51) Int. Cl.
| | |
|---|---|
| *G01C 21/00* | (2006.01) |
| *G01B 11/14* | (2006.01) |
| *G01C 21/10* | (2006.01) |
| *G01C 21/20* | (2006.01) |
| *G01S 5/16* | (2006.01) |
| *H04B 10/116* | (2013.01) |

(52) U.S. Cl.
CPC .............. *G01C 21/00* (2013.01); *G01B 11/14* (2013.01); *G01C 21/10* (2013.01); *G01C 21/206* (2013.01); *G01S 5/16* (2013.01); *H04B 10/116* (2013.01)

(58) Field of Classification Search
CPC .......... G01C 21/00; G01S 5/00; H04B 10/116
See application file for complete search history.

(56) References Cited

U.S. PATENT DOCUMENTS

| | | | |
|---|---|---|---|
| 6,865,347 B2 * | 3/2005 | Perkins | ..................... G01S 1/70 398/130 |
| 7,969,297 B2 | 6/2011 | Haartsen et al. | |
| 8,233,806 B2 | 7/2012 | Kitaji | |
| 8,321,166 B2 | 11/2012 | Ohare | |
| 8,334,898 B1 * | 12/2012 | Ryan | ..................... G01C 21/206 348/61 |

(Continued)

FOREIGN PATENT DOCUMENTS

| | | |
|---|---|---|
| CN | 1666427 A | 9/2005 |
| JP | S59224504 A | 12/1984 |

(Continued)

OTHER PUBLICATIONS

Won et al., "Visible Light Communication: Tutorial," Project: Working Group for Wireless Personal Area Networks (WPANs), Mar. 9, 2008, IEEE P802.15 <08/0114-02>, 78 pgs.

(Continued)

*Primary Examiner* — Mohamed Charioui
*Assistant Examiner* — Catherine T. Rastovski
(74) *Attorney, Agent, or Firm* — Thien T. Nguyen

(57) ABSTRACT

Methods, systems, and devices are described for determining positioning information of a mobile device using modulated light signals. A modulated light signal may be received from each of at least one light source. Each modulated light signal may be decoded to obtain identification information identifying the at least one light source. An angle of arrival of each modulated light signal may also be identified. Each angle of arrival of may be associated with an identified light source.

30 Claims, 14 Drawing Sheets

(56) References Cited

U.S. PATENT DOCUMENTS

| | | | | |
|---|---|---|---|---|
| 8,334,901 | B1* | 12/2012 | Ganick | G01S 1/70 348/131 |
| 2011/0231133 | A1* | 9/2011 | O'Hare | G01C 19/42 702/92 |
| 2011/0285515 | A1 | 11/2011 | Fushimi et al. | |
| 2012/0154824 | A1* | 6/2012 | Kim | G01S 5/16 356/623 |

FOREIGN PATENT DOCUMENTS

| | | |
|---|---|---|
| JP | S60162902 A | 8/1985 |
| JP | S62297705 A | 12/1987 |
| JP | H01243104 A | 9/1989 |
| JP | H04303216 A | 10/1992 |
| JP | 2005504957 A | 2/2005 |
| JP | 2006220465 A | 8/2006 |
| JP | 2007132853 A | 5/2007 |
| JP | 2007155699 A | 6/2007 |
| JP | 2007256100 A | 10/2007 |
| JP | 2008267898 A | 11/2008 |
| JP | 2008268204 A | 11/2008 |
| WO | WO-02095442 A1 | 11/2002 |

OTHER PUBLICATIONS

IPEA/EPO, Second Written Opinion of the International Preliminary Examining Authority, Int'l App. No. PCT/US2014/041941, dated Apr. 21, 2015, European Patent Office, Rijswijk, NL, 8 pgs.

ISA/EPO, International Search Report and Written Opinion of the International Searching Authority, Int'l App. No. PCT/US2014/041941, dated Oct. 1, 2014, European Patent Office, Rijswijk, NL, 13 pgs.

Prince et al., "A Two Phase Hybrid RSS/AoA Algorithm for Indoor Device Localization Using Visible Light," 2012 IEEE Global Communications Conference (GLOBECOM), Dec. 3-7, 2012, Anaheim, CA, pp. 3347-3352, E-ISBN 978-1-4673-0919-6, IEEE.

Sertthin et al., "A Nearest Transmitter Classification Method for VLC Based Positioning System," 2011 IEEE 22nd International Symposium on Personal Indoor and Mobile Radio Communications (PIMRC), Sep. 11-14, 2011, pp. 1259-1263, E-ISBN 978-1-4577-1347-7, IEEE.

Sertthin et al., "A Switching Estimated Receiver Position Scheme for Visible Light Based Indoor Positioning System," 4th International Symposium on Wireless Pervasive Computing, ISWPC 2009, Feb. 11-13, 2009, Melbourne, VC, pp. 1-5, E-ISBN 978-1-4244-2966-0, IEEE.

* cited by examiner

DETERMINATION OF POSITIONING INFORMATION OF A MOBILE DEVICE USING MODULATED LIGHT SIGNALS

BACKGROUND

The following relates generally to techniques for determining accurate indoor positioning of a mobile device. Determining the position of a mobile device in an indoor environment can be useful in a number of applications, such as navigating mobile phone users in office/commercial environments, enabling customers to find items in a supermarket or retail outlet, coupon issuance and redemption, customer service and accountability, etc.

Achieving precise position estimates can be a challenging task. Indoor positioning is typically achieved using radio frequency (RF) signals received from Wi-Fi access points (or similar means). However, this technique requires mobile devices to learn RF signal propagation parameters, which presents a significant technical challenge for achieving high precision (<1 m) position accuracy.

SUMMARY

The described features generally relate to one or more improved methods, systems, and/or apparatuses for determining positioning information of a mobile device using modulated light signals.

A method for determining positioning information of a mobile device using modulated light signals is described. In one configuration, a modulated light signal may be received from each of at least one light source. Each modulated light signal may be decoded to obtain identification information identifying the at least one light source. An angle of arrival of each modulated light signal may also be identified. Each angle of arrival may be associated with an identified light source.

In some embodiments, a location of each light source may be identified. The location of each light source may be identified, in some cases, by referencing at least one database using the identification information. In some cases, a position of the mobile device may be determined based at least in part on the identified location of each light source and the identified angle of arrival of each modulated light signal. Determining the position of the mobile device may in some cases include estimating a distance from the mobile device to each of the at least one light source. Estimating the distance to a light source may in some cases include determining a height of a plane, relative to the mobile device, in which the light source is located, and using the height and the identified angle of arrival of the modulated light signal received from the light source to estimate the distance from the mobile device to the light source. In some configurations, each modulated light signal may be received using an image sensor, and determining the height of the plane may include measuring a distance in pixels between two illuminated regions captured by the image sensor (where the two illuminated regions correspond to two light sources), and comparing the measured distance to a known distance between the two light sources. The known distance between the two light sources may in some cases be obtained from a database.

In some embodiments, the modulated light signals may be decoded using an image sensor.

In some embodiments, the angle of arrival of each modulated light signal may be identified using an image sensor. In these embodiments, identifying the angle of arrival of a modulated light signal may include determining a position of an illuminated region captured by the image sensor. The position may be specified in terms of pixel indices.

In some embodiments, the angle of arrival of each modulated light signal may be identified based at least in part on an orientation of the mobile device.

In some embodiments, identifying the angle of arrival of a modulated light signal may include: estimating a relative angle of arrival of the modulated light signal with respect to a coordinate system of the mobile device; acquiring measurements of an orientation of the mobile device using an orientation sensor; and estimating an absolute angle of arrival of the modulated light signal with respect to an absolute coordinate system, based at least in part on the acquired measurements and the relative angle of arrival. The coordinate system of the mobile device may in some cases be based at least in part on a vector perpendicular to a plane parallel to the mobile device. The orientation sensor may in some cases include a gyroscope or an accelerometer.

In some embodiments, determining the position of the mobile device may include performing trilateration with respect to the identified locations of three light sources and the identified angles of arrival of three modulated light signals received from the three light sources.

In some embodiments, the at least one light source may include a light emitting diode (LED) luminaire.

In some embodiments, each modulated light signal may include a visible light communication (VLC) signal or an infrared signal.

An apparatus for determining positioning information of a mobile device using modulated light signals is also described. In one configuration, the apparatus may include a processor, a memory in electronic communication with the processor, and instructions stored in the memory. The instructions may be executable by the processor to receive a modulated light signal from each of at least one light source; decode each modulated light signal to obtain identification information identifying the at least one light source; identify an angle of arrival of each modulated light signal; and associate each angle of arrival with an identified light source.

Another apparatus for determining positioning information of a mobile device using modulated light signals is also described. In one configuration, the apparatus may include a means for receiving a modulated light signal from each of at least one light source; a means for decoding each modulated light signal to obtain identification information identifying the at least one light source; a means for identifying an angle of arrival of each modulated light signal; and a means for associating each angle of arrival with an identified light source.

A computer program product for determining positioning information of a mobile device using modulated light signals is also described. The computer program product may include a non-transitory computer-readable medium storing instructions executable by a processor to receive a modulated light signal from each of at least one light source; decode each modulated light signal to obtain identification information identifying the at least one light source; identify an angle of arrival of each modulated light signal; and associate each angle of arrival with an identified light source.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The determination of positioning information of a mobile device using modulated light signals is described. More particularly, a mobile device may receive information-carrying light signals from one or more light sources. The information-carrying light signals may take various forms, such as visible light communication (VLC) signals or infrared signals transmitted by a light emitting diode (LED) or other luminaire capable of having its intensity modulated. Using, for example, an image sensor and orientation sensor of the mobile device, the mobile device may decode the light signals received from one or more light sources, identify an angle of arrival of the light signal received from each light source, and associate each angle of arrival with an identified light source. The angle of arrival of a modulated light signal received from an identified light source is one form of positioning information that may be determined Other forms of positioning information may also be determined. For example, when a mobile device receives modulated light signals from at least three light sources, the mobile device may use trilateration to determine the location of the mobile device. The positioning information determined by the mobile device may also include, for example, a distance of the mobile device from each of a number of light sources.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
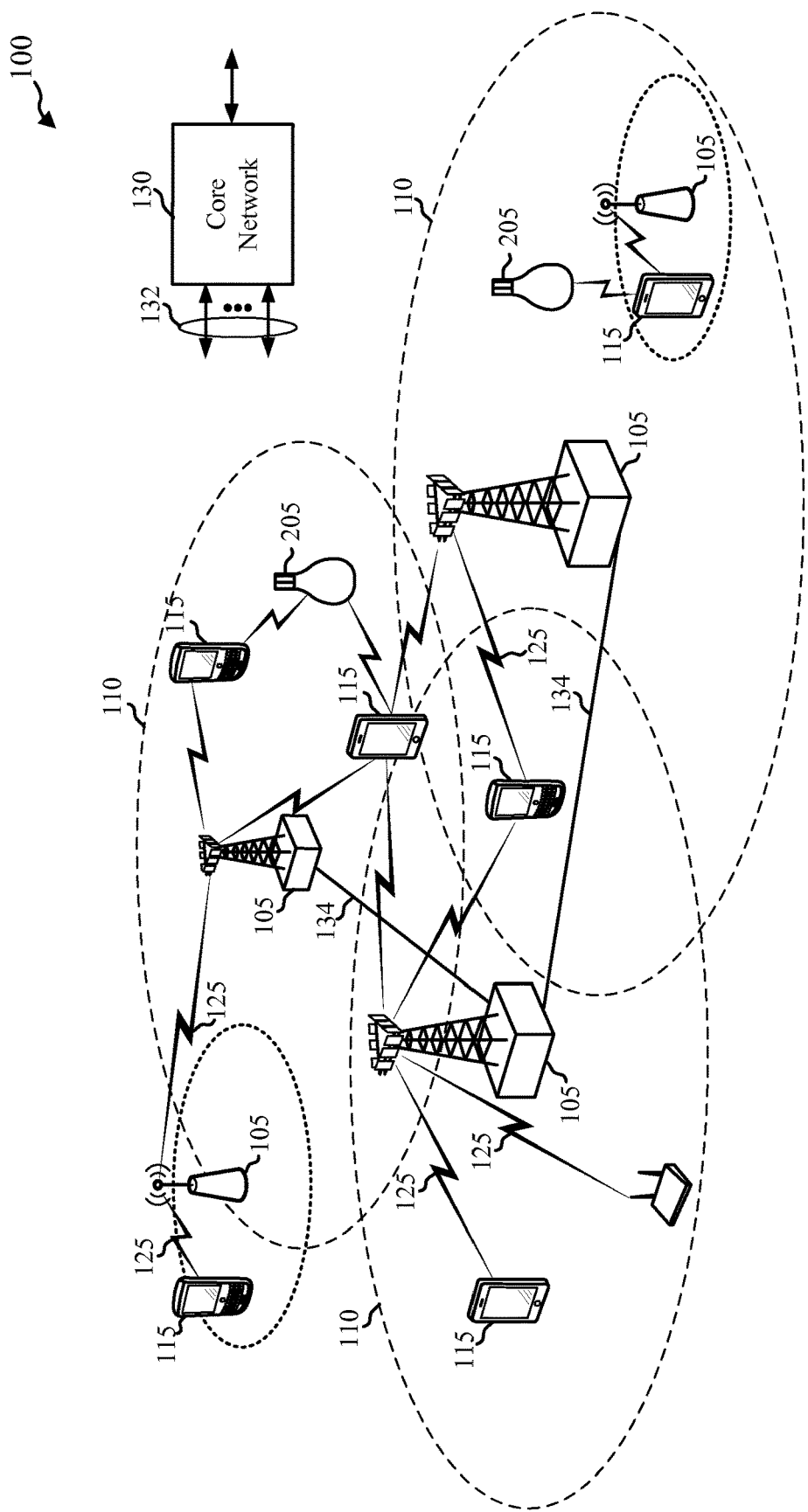
FIG. 1 shows a first block diagram of a wireless communications system.

Referring first to FIG. 1, a diagram illustrates an example of a wireless communications system 100. The system 100 includes a plurality of access points (e.g., base stations, eNBs, or WLAN access points) 105, a number of mobile devices 115, and a core network 130. Some of the access points 105 may communicate with the mobile devices 115 under the control of a base station controller (not shown), which may be part of the core network 130 or certain access points 105 (e.g., base stations or eNBs) in various embodiments. Some of the access points 105 may communicate control information and/or user data with the core network 130 through backhaul 132. In some embodiments, some of the access points 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the mobile devices 115 via one or more access point antennas. Each of the access points 105 may provide communication coverage for a respective geographic area 110. In some embodiments, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, or some other suitable terminology. The coverage area 110 for an access point may be divided into sectors making up only a portion of the coverage area (not shown). The system 100 may include access points 105 of different types (e.g., macro, micro, and/or pico base stations). The access points 105 may also utilize different radio technologies. The access points 105 may be associated with the same or different access networks. The coverage areas of different access points 105, including the coverage areas of the same or different types of access points 105, utilizing the same or different radio technologies, and/or belonging to the same or different access networks, may overlap.

In some embodiments, the system 100 may include an LTE/LTE-A communications system (or network). In LTE/LTE-A communications systems, the term evolved Node B (eNB) may be generally used to describe one of the access points 105 and the term user equipment (UE) may be generally used to describe one of the mobile devices 115. The system 100 may also be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE may be able to communicate with macro eNBs, pico eNBs, femto eNBs, relays, and the like. A UE may also be able to communicate over different access networks, such as cellular or other WWAN access networks, or WLAN access networks.

The communication links 125 shown in system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions.

In some cases, a mobile device 115 may be capable of receiving information-carrying light signals, such as visible light communication (VLC) signals or infrared signals. When illuminated by a light source 205 capable of transmitting an information-carrying light signal, the mobile device 115 may receive and decode the light signal to obtain identification information for the light source 205. The identification information contained in the light signal may in some cases include a repeated codeword, such as a Media Access Control (MAC) address that uniquely identifies the light source 205 that transmitted the light signal or a less unique codeword that identifies the light source 205 within a particular context (e.g., within a particular building). The identification information may enable the mobile device 115 to determine the location of the light source 205 (e.g., by looking up the location in a database). In other cases, the identification information may contain a description of the location of the light source 205. The location of the light source 205 may be an absolute location (e.g., a latitude and longitude) or may be specified relative to a reference or venue (e.g., relative to a building). By identifying the angle of arrival of the light signal, the mobile device 115 may be able to determine positioning information based on the light signal. In some cases, the positioning information may include a direction of one or more light sources 205 with respect to the mobile device. In some cases, the positioning information may also or alternately include an estimate of the distance from the mobile device 115 to one or more light sources 205. In some cases, the mobile device 115 may receive light signals from more than one light source 205 and determine additional positioning information, such as the location of the mobile device 115.

Figure 2:
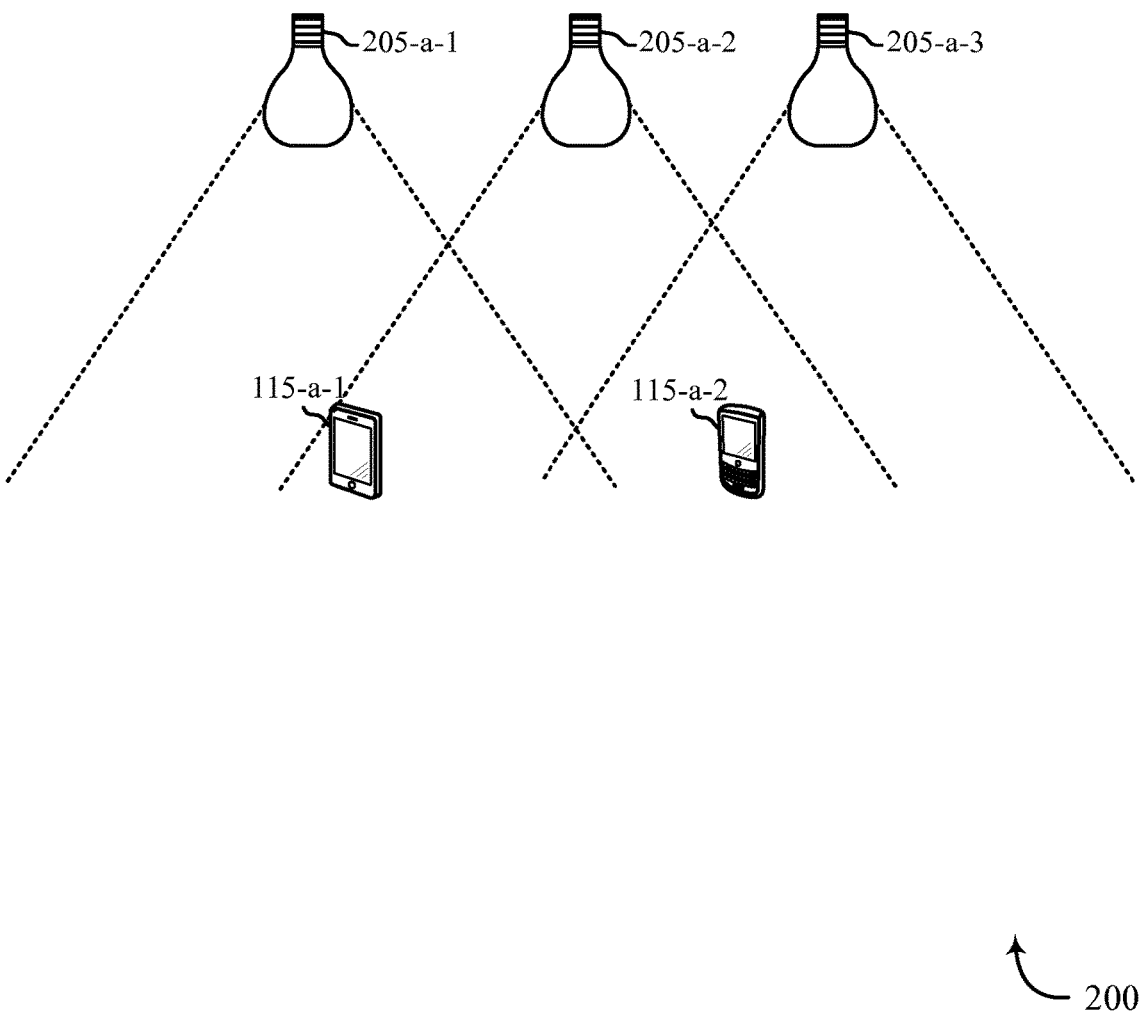
FIG. 2 shows an elevation of a number of mobile devices, each of which may be illuminated by one or more of a number of light sources in accordance with various embodiments.

Turning now to FIG. 2, there is shown an elevation 200 of a number of mobile devices 115-*a*-1, 115-*a*-2, each of which is illuminated by one or more of a number of light sources 205-*a*-1, 205-*a*-2, 205-*a*-3. Each of the mobile devices 115-*a*-1, 115-*a*-2 may be illuminated by one or more of the light sources 205-*a*-1, 205-*a*-2, 205-*a*-3, with the set of light sources that illuminate a particular one of the mobile devices 115-*a*-1, 115-*a*-2 changing as the mobile device is moved from one position to another. By way of example, the mobile device 115-*a*-1 is shown to be illuminated by the light sources 205-*a*-1 and 205-*a*-2, and the mobile device 115-*a*-2 is shown to be illuminated by the light sources 205-*a*-2 and 205-*a*-3. The mobile devices 115-*a*-1, 115-*a*-2 may be examples of one or more aspects of the mobile devices 115 described with reference to FIG. 1. The light sources 205-*a*-1, 205-*a*-2, 205-*a*-3 may also be examples of one or more aspects of the light sources 205 described with reference to FIG. 1, and may take various forms. In some embodiments, each light source 205 may include a light emitting diode (LED) luminaire, a compact fluorescent lighting (CFL) luminaire, an incandescent luminaire, and/or another form of luminaire. In some cases, the light sources 205 may be suspended from or mounted on a ceiling, wall, desktop, or other surface. Different light sources may be suspended from or mounted on different surfaces. Each of the light sources 205-*a*-1, 205-*a*-2, 205-*a*-3 may also represent a singular luminaire, a combination of luminaires, or a complex array of luminaires as might be found in a television, computer screen, or electronic sign or billboard.

Each of the light sources 205-*a*-1, 205-*a*-2, 205-*a*-3 may contain (or be associated with) circuitry for generating a modulated light signal (e.g., an information-carrying light signal), such as a VLC signal or infrared signal. The modulated light signal may be generated using the primary luminaire of the light source 205-*a*-1, 205-*a*-3, 205-*a*-3, or using a secondary luminaire, such as a luminaire that is provided particularly for the purpose of generating a modulated light signal. In the latter case, and by way of example, a light source 205 might use a CFL luminaire as its primary light producing mechanism and use an LED luminaire particularly for the purpose of generating a modulated light signal.

Each of the mobile devices 115-*a*-1, 115-*a*-2 may include circuitry for receiving and decoding a modulated light signal. The circuitry may in some cases include an image sensor such as an image sensor containing an array of photodiodes (e.g., a complementary metal-oxide semiconductor (CMOS) image sensor).

Figure 3:
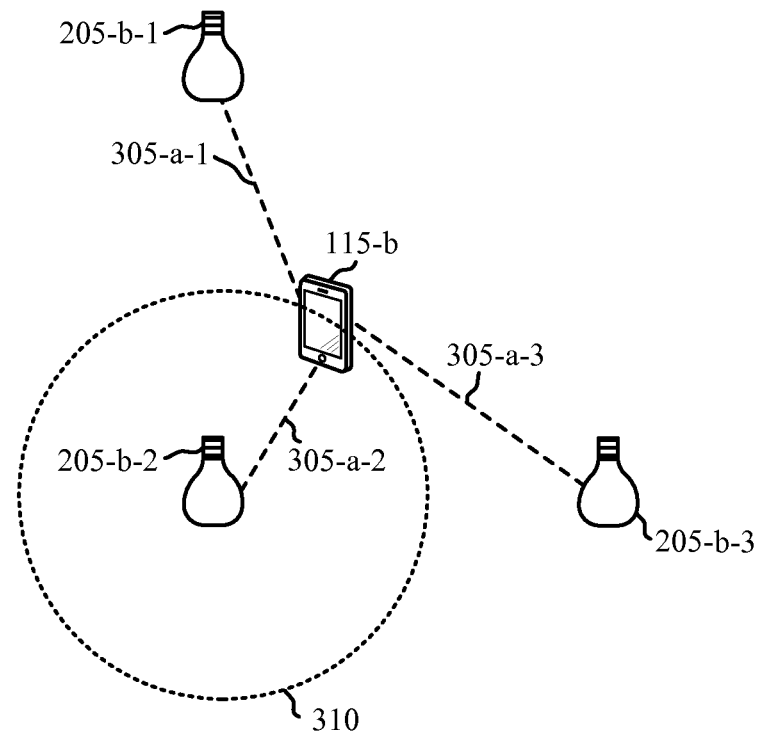
FIG. 3 provides a plan view illustrating a mobile device illuminated by three light sources in accordance with various embodiments.

FIG. 3 provides a plan view 300 illustrating a mobile device 115-*b* illuminated by three light sources 205-*b*-1, 205-*b*-2, 205-*b*-3. The mobile device 115-*b* may be an example of one or more aspects of one of the mobile devices 115 described with reference to FIGS. 1 and/or 2. The light sources 205-*b*-1, 205-*b*-2, 205-*b*-3 may be examples of one or more aspects of one of the light sources 205 described with reference to FIGS. 1 and/or 2. By receiving and decoding the modulated light signal emitted by only one of the light sources (e.g., light source 205-*b*-2), the mobile device 115-*b* may determine a direction from the mobile device 115-*b* to the light source 205-*b*-2. By further identifying a location of the light source 205-*b*-2, the mobile device 115-*b* may estimate a distance 305-*a*-2 from the mobile device 115-*b* to the light source 205-*b*-2. The distance 305-*a*-2 may indicate that the mobile device 115-*b* is positioned somewhere along the circumference 310. By receiving and decoding the modulated light signal received from each of the three light sources 205-*b*-1, 205-*b*-2, 205-*b*-3, identifying a location of each of the three light sources 205-*b*-1, 205-*b*-2, 205-*b*-3, and identifying the angle of arrival of the light signal received from each light source 205-*b*-1, 205-*b*-2, 205-*b*-3, the mobile device 115-*b* may not only estimate the distances 305-*a*-1, 305-*a*-2, 305-*a*-3 from the mobile device 115-*b* to each light source 205-*b*-1, 205-*b*-2, 205-*b*-3, but may also determine a position (e.g., location) of the mobile device 115-*b* (e.g., using trilateration). Methods, systems, and/or apparatuses for determining positioning information of a mobile device using modulated light signals are described in more detail below.

Figure 4:
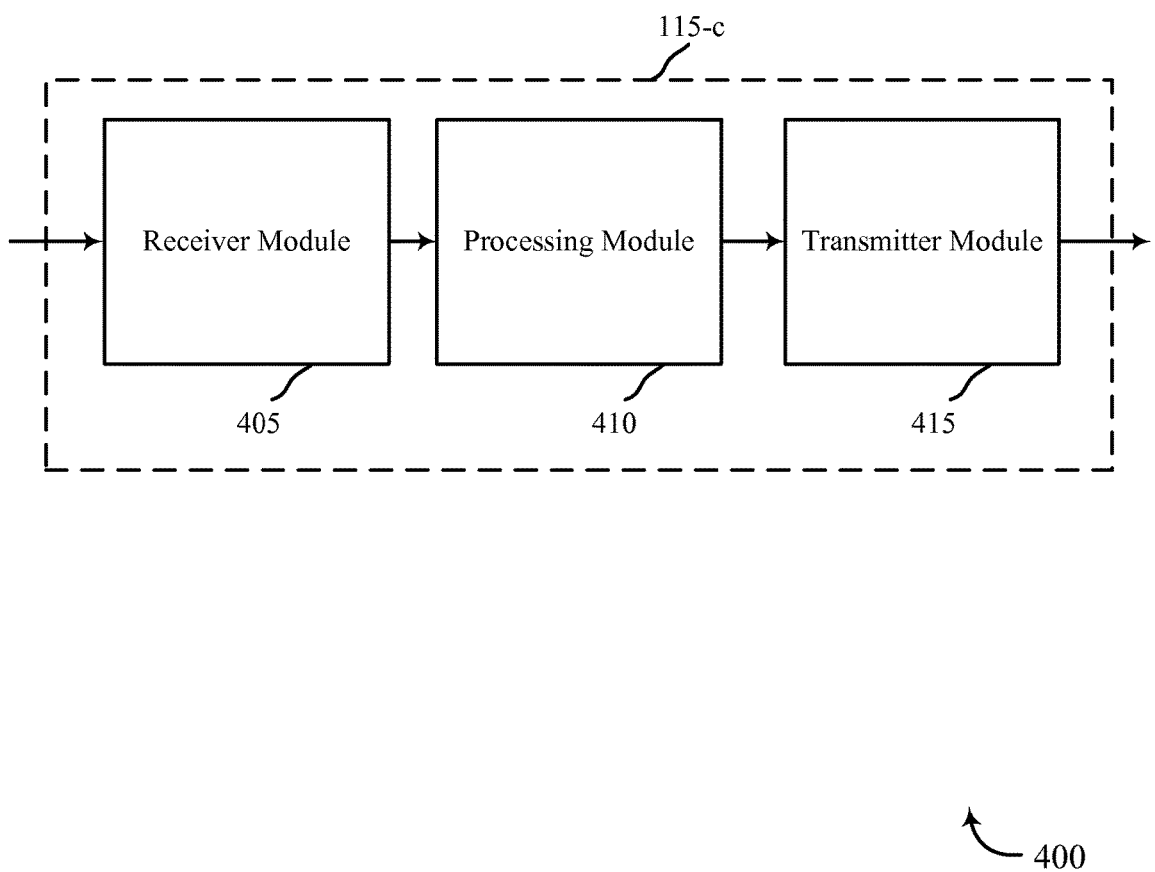
FIG. 4 is a block diagram of a mobile device capable of determining positioning information using modulated light signals in accordance with various embodiments.

Referring now to FIG. 4, a block diagram 400 illustrates a mobile device 115-*c* capable of determining positioning information using modulated light signals, in accordance with various embodiments. The mobile device 115 may be an example of one or more aspects of one of the mobile devices 115-*c* described with reference to FIGS. 1, 2, and/or 3. The mobile device 115-*c* may also be a processor. The mobile device 115-*c* may include a receiver module 405, a processing module 410, and/or a transmitter module 415. Each of these components may be in communication with each other.

The components of the mobile device 115-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 may include a receiver for receiving modulated light signals, such as a VLC receiver for receiving VLC signals (or an infrared receiver for receiving infrared signals) from one or more light sources 205. The receiver module 405 may also include a cellular receiver, which in some cases may include an LTE/LTE-A receiver. The cellular receiver may be used to receive various types of data and/or control signals (i.e., transmissions) over one or more communication channels of a wireless communications system, such as the wireless communications system 100 shown in FIG. 1. The receiver module 405 may further include a wireless local area network (WLAN) receiver. The WLAN receiver may also be used to receive various types of data and/or control signals.

The processing module 410 may perform various functions. In some embodiments, the processing module 410 may operate or control the receiver module 405 to receive a modulated light signal from each of at least one light source 205. The processing module 410 may also decode each modulated light signal to obtain identification information identifying the at least one light source 205. The processing module 410 may further identify an angle of arrival of each modulated light signal. The processing module 410 may then associate each angle of arrival with an identified light source 205. An angle of arrival of a modulated light signal, in association with the identity of the light source 205 that generated the modulated light signal, is one form of positioning information that may be determined by the mobile device 115-*c*.

The transmitter module 415 may include a cellular transmitter, and in some cases may include an LTE/LTE-A transmitter. The transmitter module 415 may also or alternately include a WLAN transmitter. The transmitter module 415 may be used to transmit various types of data and/or control signals over one or more communication channels of a wireless communications system, such as the wireless communications system 100.

Figure 5:
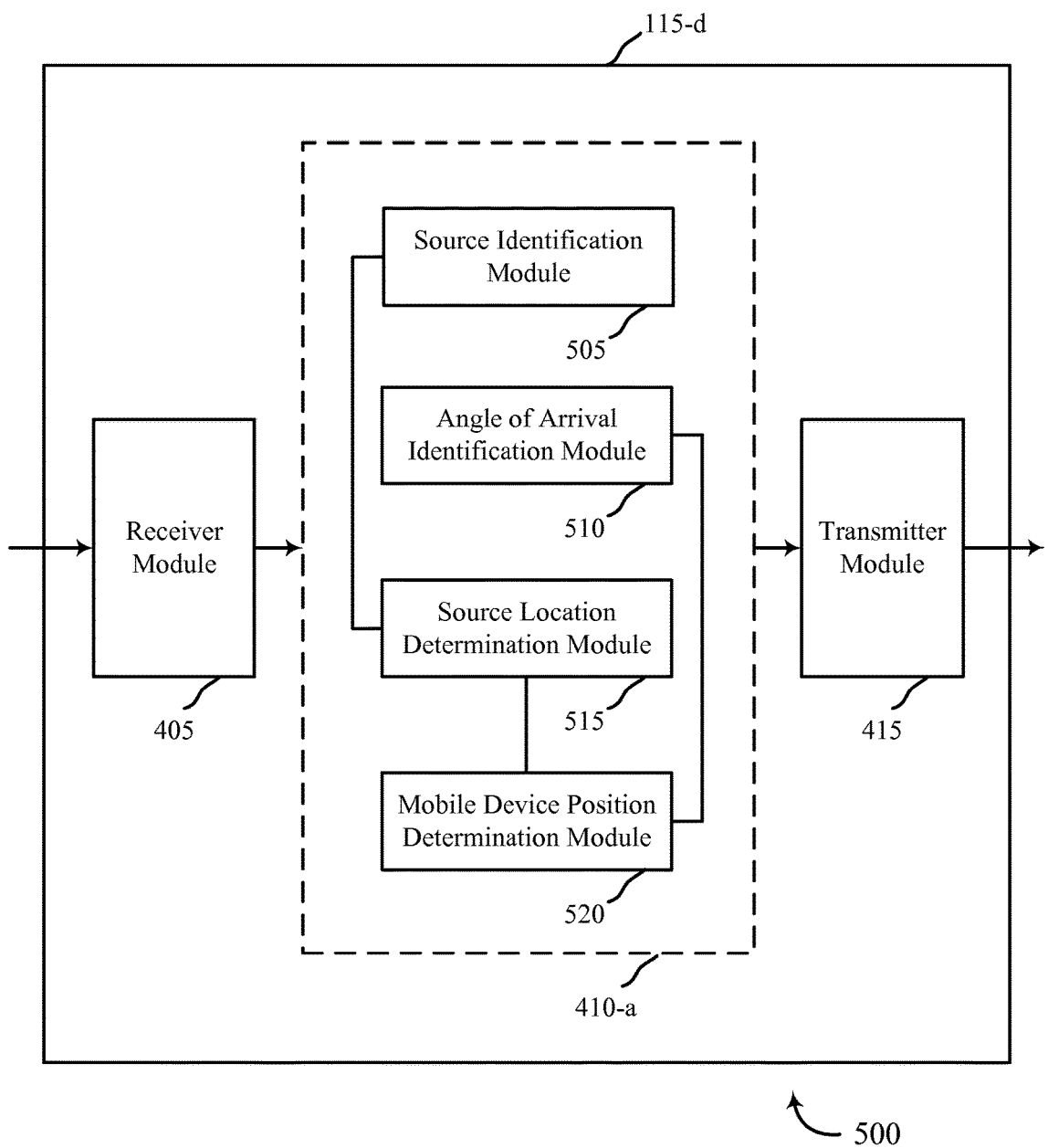
FIG. 5 is a block diagram of another mobile device capable of determining positioning information using modulated light signals in accordance with various embodiments.

Referring now to FIG. 5, a block diagram 500 illustrates a mobile device 115-*d* capable of determining positioning information using modulated light signals in accordance with various embodiments. The mobile device 115-*d* may be an example of one or more aspects of one of the mobile devices 115 described with reference to FIGS. 1, 2, 3, and/or 4. The mobile device 115-*d* may also be a processor. The mobile device 115-*d* may include a receiver module 405, a processing module 410-*a*, and/or a transmitter module 415. Each of these components may be in communication with each other.

The components of the mobile device 115-*d* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 and transmitter module 415 may be configured similarly to what is described with respect to FIG. 4. The processing module 410-a may be an example of aspects of the processing module 410 described with reference to FIG. 4 and may include a source identification module 505 and/or an angle of arrival identification module 510. In some cases, the processing module 410-a may further include a source location determination module 515 and/or a mobile device position determination module 520.

The source identification module 505 may decode each modulated light signal to obtain identification information identifying the at least one light source 205. The identification information may take various forms. For example, the identification information may include a MAC address that uniquely identifies the light source 205 that transmitted the light signal or a less unique codeword that identifies the light source 205 within a particular context (e.g., within a particular building).

The angle of arrival identification module 510 may identify an angle of arrival of each light signal.

The source location determination module 515 may identify a location of each light source 205. In some cases, the location of a light source 205 may be looked up based at least in part on the identification information obtained for the light source 205. In other cases, the identification information may contain a description of the location of the light source 205. The location of the light source 205 may be an absolute location (e.g., a latitude and longitude) or may be specified relative to a reference or venue (e.g., relative to a building).

The positioning information determination module 515 may determine positioning information of the mobile device 115-d (e.g., a direction from the mobile device 115-d to each of one or more light sources 205—possibly expressed as angles of arrival of the modulated light signals received by the mobile device 115-d from the light sources 205; a distance from the mobile device 115-d to each of the one or more light sources 205; and/or a position of the mobile device 115-d). The positioning information may be determined, for example, based on the angle of arrival of each light signal identified by the angle of arrival identification module 510 and/or the location(s) of each light source identified by the source location determination module 515.

Figure 6:
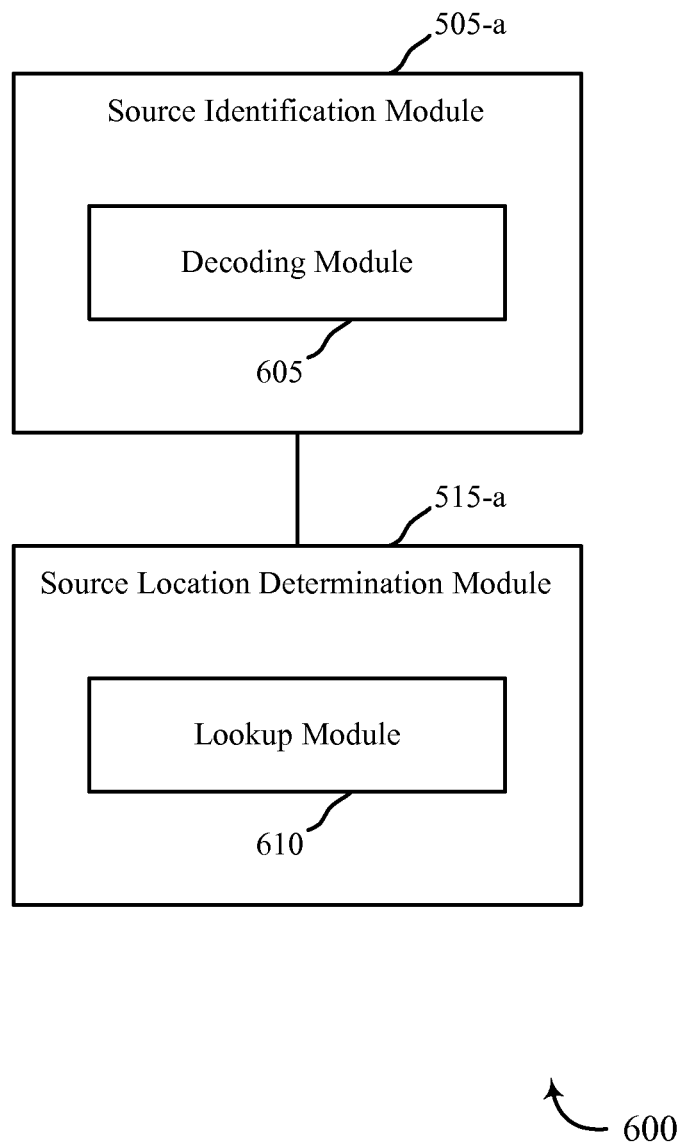
FIG. 6 is a block diagram of a source identification module and a source location determination module in accordance with various embodiments.

Referring now to FIG. 6, a block diagram 600 illustrates a source identification module 505-a and a source location determination module 515-a in accordance with various embodiments. The source identification module 505-1 may be an example of one or more aspects of the source identification module 505 described with reference to FIG. 5. The source location determination module 515-a may be an example of one or more aspects of the source location determination module 515 described with reference to FIG. 5. The source identification module 505-a may include a decoding module 605, and the source location determination module 515-a may include a lookup module 610.

The decoding module 605 may decode each light signal received by a mobile device 115 to obtain identification information for each light source 205. The light signal(s) received by the mobile device may in some cases be decoded using an image sensor, such as a complementary metal-oxide semiconductor (CMOS) image sensor. The light signal(s) may also be decoded using other circuitry, in place of or in combination with the CMOS image sensor.

The identification information obtained for a light source 205 may include, for example, a globally unique identifier of the light source 205 (e.g., a MAC address) or a non-globally unique identifier of the light source 205.

The lookup module 610 may reference at least one database using the identification information, to identify the location of each light source 205. The at least one database may include one or more databases that are stored remotely from the mobile device 115, which database(s) may be accessed by transmitting the identification information to a remote server that hosts the database(s). The identification information may be transmitted via the transmitter module 415. The location of each light source 205 may then be received via the receiver module 405. Alternately (or additionally), the at least one database may include one or more databases that are stored locally on the mobile device 115.

The location of each source may in some cases be an absolute location, such as global positioning system (GPS) coordinates. In other cases, the location may be a location relative to a building plan, map or some other reference. In still other cases, the location information may include a height of the light source 205 with respect to a reference plane. In some cases, the location may be expressed in Cartesian coordinates or another type of coordinates.

Figure 7:
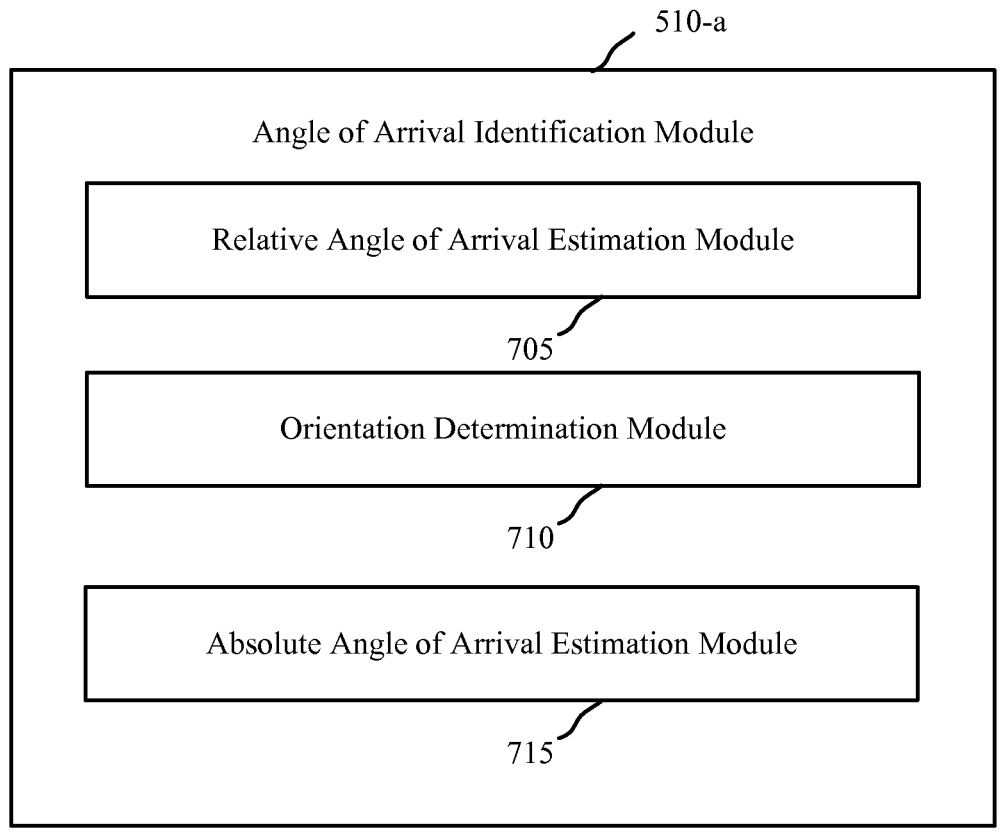
FIG. 7 is a block diagram of an angle of arrival identification module in accordance with various embodiments.

Referring now to FIG. 7, a block diagram 700 illustrates an angle of arrival identification module 510-a in accordance with various embodiments. The angle of arrival identification module 510-a may be an example of one or more aspects of the angle of arrival identification module 510 described with reference to FIG. 5. The angle of arrival identification module 510-a may include a relative angle of arrival estimation module 705, an orientation determination module 710, and/or an absolute angle of arrival estimation module 715.

The relative angle of arrival estimation module 705 may, for each light signal received by a mobile device 115, estimate a relative angle of arrival of the light signal with respect to a coordinate system of the mobile device 115. The relative angle of arrival of a modulated light signal may be estimated, in some cases, by determining a position of an illuminated region captured by an image sensor illuminated by a light source 205. The illuminated region may be defined as an array of pixels within the image sensor, and may in some cases be specified in terms of pixel indices. A centroid of the illuminated region (e.g., a location $(x_0, y_0)$), may be found relative to the image sensor's coordinate system, which may also be considered the coordinate system of the mobile device 115. The image sensor's coordinate system is defined by a pair of axes centered at the midway pixel along the width and the length of the image sensor. For example, if the sensor is 480 pixels wide and 640 pixels long, then the coordinate axes are centered at the pixel index pair (240, 320). If the centroid of the identified region of the image is at pixel indices (250, 335) then the location of the region is given by $(x_0, y_0) = (10, 15)$. In general, if the pixel indices are $(p_x, p_y)$ and the center of the sensor is at pixel indices $(c_x, c_y)$, the location of the region is $(x_0, y_0) = (p_x, p_y) - (c_x, c_y)$. A pair of angles $(\omega_x, \omega_y)$ may then be determined as a function of the centroid $(x_0, y_0)$. This pair of angles determines the angle of arrival of a modulated light signal received by the mobile device 115, expressed in terms of the coordinate system of the mobile device 115, which is a three dimensional coordinate system wherein the axis perpendicular to the plane that the mobile device lies in is the Z-axis and the X and Y axes span the plane that the mobile device lies in and coincide with the image sensor's coordinate axes. For example, if the half of the field of view (FOV) angle is denoted by $\theta_{half}$ and the screen resolution in pixels is denoted by $X_{res}$ by $Y_{res}$, then the mapping between the centroid $(x_0, y_0)$ and the relative angle of arrival $(\omega_x, \omega_y)$ of a light signal may be given by the equations:

$$\omega_x = \arctan\left(\frac{2x_0}{X_{res}} \tan(\theta_{half})\right),$$

$$\omega_y = \arctan\left(\frac{2y_0}{Y_{res}} \tan(\theta_{half})\right)$$

The orientation determination module 710 may acquire measurements of an orientation of the mobile device 115 using an orientation sensor. In some cases, the orientation sensor may include a gyroscope or an accelerometer. The orientation determination module 710 may report a pair of angles $(\theta_x, \theta_y)$ which represent the angles of rotation (or orientation) of the mobile device 115 with respect to a reference (or absolute) coordinate system. For example, if gyroscope or accelerometer sensors are used, the angles $(\theta_x, \theta_y)$ would represent the pitch and roll of the mobile device relative to the earth's coordinate system.

The absolute angle of arrival estimation module 715 may estimate an absolute angle of arrival of each modulated light signal with respect to the reference coordinate system (e.g., the earth's coordinate system). The absolute angle of arrival of a modulated light signal may be estimated, in some cases, by adjusting the relative angle of arrival with the orientation angle as measured by a gyroscope or accelerometer.

In some embodiments, the absolute angle of arrival may be determined by multiplying a unit vector, expressed relative to a coordinate system of the mobile device, by a rotation matrix to obtain a unit vector expressed relative to an absolute coordinate system (e.g., the earth's coordinate system). For example, a unit vector in the mobile device's coordinate system may be expressed as:

$$\hat{u}_{device} = \frac{\vec{u}_{device}}{|\vec{v}|},$$

where $$\vec{v} = [\tan(\omega_x), \tan(\omega_y), 1],$$

where $$|\vec{v}| = \tan(\omega_x)^2 + \tan(\omega_y)^2 + 1$$

This is a unit vector extending from the mobile device to the light source expressed in the coordinate system of the mobile device, as defined above.

From the unit vector that is expressed in the coordinate system of the mobile device (denoted by $\hat{u}$ above), a unit vector that is expressed in an absolute coordinate system may be obtained. For example, the earth's coordinate system (an absolute coordinate system) may be defined by a Z axis that is parallel to the gravity vector, and X and Y axes that are in the plane of the earth's surface. The relative orientation of the X and Y axes in that plane may be arbitrary or be aligned with the earth's magnetic field. To convert the unit vector $\hat{u}$ from the coordinate system of the mobile device to the earth's coordinate system, the unit vector $\hat{u}$ may be multiplied by a rotation matrix. The rotation matrix may represent the rotation of the mobile device around some axis in the earth's coordinate system. For example, a rotation of the mobile device amounting to $\theta_x$ degrees around the Y axis of the earth's coordinate system (known as roll) may be represented as $$R_Y(\theta_x) = \begin{bmatrix} 1 & 0 & 0 \\ 0 & \cos(\theta_x) & -\sin(\theta_x) \\ 0 & \sin(\theta_x) & \cos(\theta_x) \end{bmatrix}$$

A rotation of $\theta_y$ degrees around the X axis of the earth's coordinate system (known as pitch) may be represented as $$R_X(\theta_y) = \begin{bmatrix} \cos(\theta_y) & 0 & \sin(\theta_y) \\ 0 & 1 & 0 \\ -\sin(\theta_y) & 0 & \cos(\theta_y) \end{bmatrix}$$

The unit vector in the earth's coordinate system can then be expressed as $$\hat{u}_{earth} = R_Y(\theta_x) R_X(\theta_y) \hat{u}_{device}$$

Given the unit vector in the earth's coordinate system, $\hat{u}_{earth}$, a vector from the light source to the mobile device, $\vec{v}_{earth}$, can be computed by scaling $\hat{u}_{earth}$ so that the z-coordinate of the resulting vector is equal to the height of the light source from the mobile device. In other words, if $\hat{u}_{earth}(z)$ is the z-coordinate of unit vector $\hat{u}_{earth}$ and $d_z$ is the height, then the vector $\vec{v}_{earth}$ may be written as:

$$\vec{v}_{earth} = \frac{d_z \hat{u}_{earth}}{\hat{u}_{earth}(z)}$$

Figure 8:
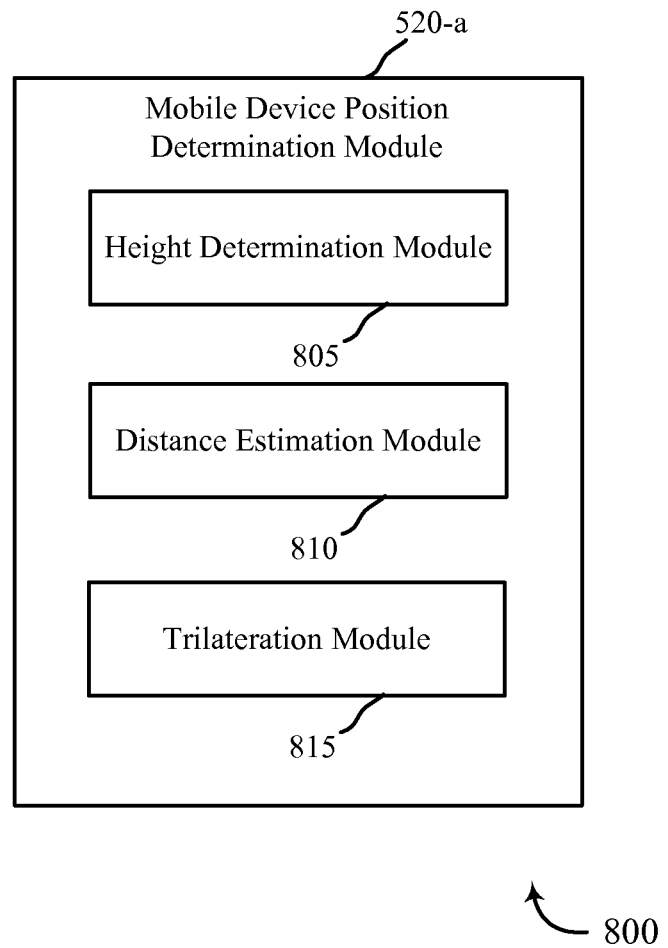
FIG. 8 is a block diagram of a mobile device position determination module in accordance with various embodiments.

Referring now to FIG. 8, a block diagram 800 illustrates a mobile device position information determination module 520-*a* in accordance with various embodiments. The position determination module 520-*a* may be an example of one or more aspects of the mobile device position determination module 520 described with reference to FIG. 5. The position determination module 520-*a* may include a height identification module 805, a distance estimation module 810, and/or a trilateration module 815.

The height identification module 805 may identify a height of a plane, relative to the mobile device 115, in which the light source 205 is located. The height of the plane may in some cases be determined by measuring a distance in pixels between two illuminated regions captured by an image sensor of the mobile device 115, where the two illuminated regions correspond to two light sources 205. The measured distance may then be compared to a known distance between the two light sources 205. The known distance between the light sources 205 may be obtained, for example, from a database or from location information decoded from the light signals received from the light sources 205.

In more detail, the height $d_z$ of the light source from the mobile device may be determined by receiving modulated light signals from at least two light sources as illuminated regions on an image sensor and determining the coordinates of the centroids of the illuminated regions relative to the image sensor's coordinate system. For example, if the two centroids are denoted as $(x_0^1, y_0^1)$ and $(x_0^2, x_0^2)$, where the superscripts indicate indices of the identified light sources, then let the actual physical distance (known distance) between the two light sources be denoted $d_{12}$. The known distance between the light sources may be obtained from a map or database, or from the identification information decoded from the modulated light signals received from the at least two light sources. Given the two identified light sources, unit vectors, relative to the earth's coordinate system, in the direction of each of them can be determined as mentioned above. The height of the light sources from the mobile device may then be obtained based on the angle between the two unit vectors and the known distance between the two light sources. The angle between the two unit vectors may be computed using an inner product.

The distance estimation module 810 may estimate a distance from the mobile device 115 to each light source 205. For example, using 1) the height $d_z$ of a light source 205 with respect to the mobile device 115, and 2) the identified angle of arrival $(\varphi_x, \varphi_y)$ of the light signal received from the light source 205, the distance from the mobile device 115 to the light source 205 along the x-axis and the y-axis of a Cartesian coordinate system may be estimated using the following equations:

$$d_x = \frac{d_z}{\tan\left(\frac{\pi}{2} - \varphi_x\right)},$$

$$d_y = \frac{d_z}{\tan\left(\frac{\pi}{2} - \varphi_y\right)}$$

The hypotenuse distance can be computed as:

$$d = \sqrt{d_x^2 + d_y^2}$$

The trilateration module 815 may perform trilateration with respect to the identified locations of three light sources 205 and the identified angles of arrival of three modulated light signals received from the three light sources 205. The trilateration may be based on estimates of the distance from a mobile device 115 to each of the three light sources 205, and may be used to estimate the position of the mobile device with respect to, for example, a GPS or Cartesian coordinate system.

Figure 9:
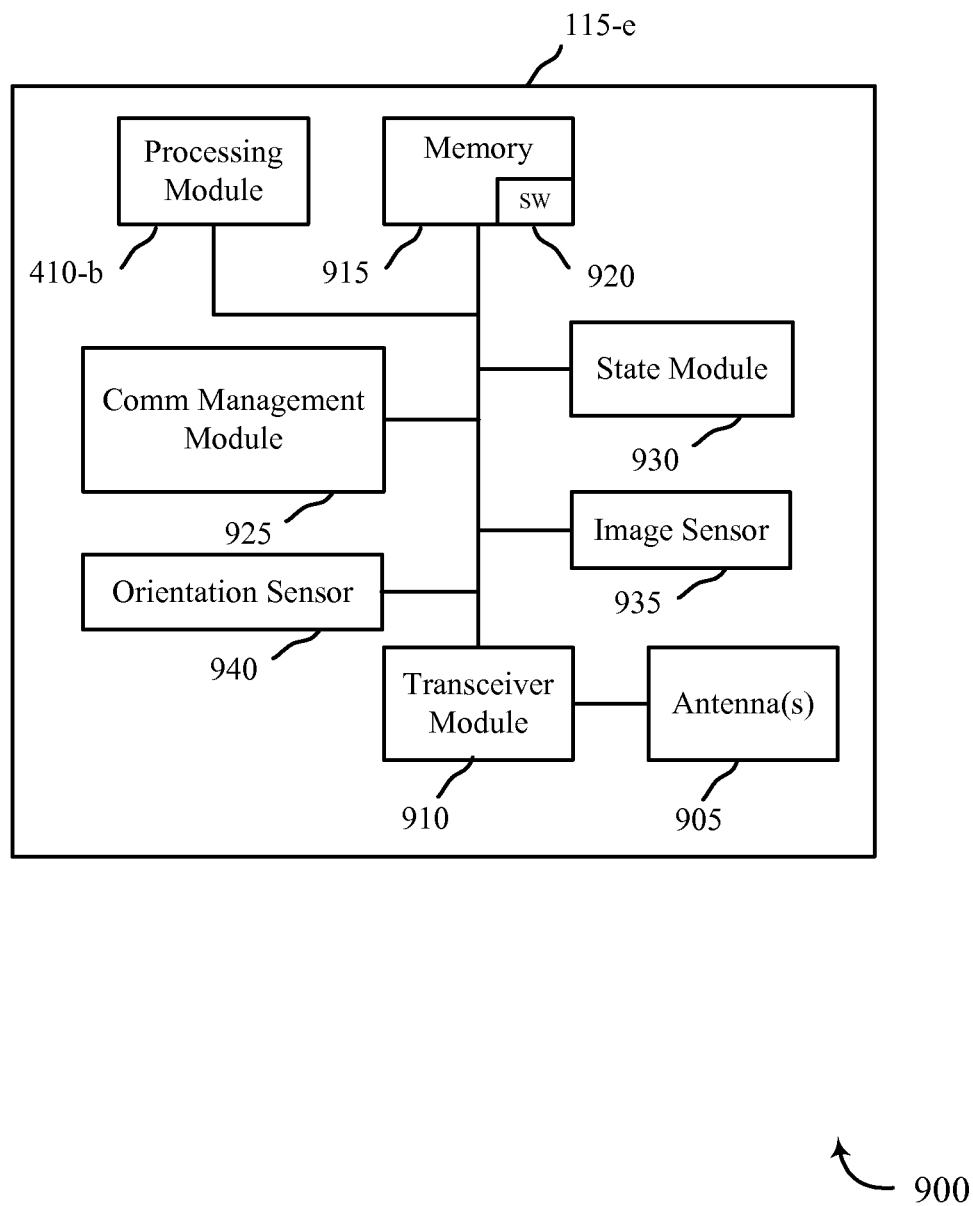
FIG. 9 is a block diagram of yet another mobile device capable of determining positioning information using modulated light signals in accordance with various embodiments.

FIG. 9 is a block diagram 900 illustrating an example of a mobile device 115-e. The mobile device 115-e may be an example of one or more aspects of the mobile device 115 described with reference to FIGS. 1, 2, 3, 4, and/or 5. The mobile device 115-e may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-e may have an internal power supply (not shown), such as a small battery, to facilitate mobile operation.

The mobile device 115-e may include one or more antenna(s) 905, a transceiver module 910, memory 915, and a processing module 410-b, which each may be in communication, directly or indirectly, with each other (e.g., via one or more buses). The transceiver module 910 may be configured to communicate bi-directionally, via the antenna(s) 905 and/or one or more wired or wireless links, with one or more networks, as described above. For example, the transceiver module 910 may be configured to receive transmissions from one or more light sources 205 of FIGS. 1, 2, and/or 3. The transceiver module 910 may allow transmission and reception of data between the mobile device 115-e and one or more remote devices, such as one or more of the light sources 205. For example, the transceiver module 910 may enable the mobile device 115-e to receive VLC signals from one or more remote light sources 205. The VLC signals may in some cases be received via an image sensor 935 such as a CMOS image sensor. In some embodiments, the image sensor 935 may be a part of the transceiver module 910. Also, and by way of example, the transceiver module 910 may enable the mobile device 115-e to receive data and/or control signals from an access point, such as one of the access points 105 described with reference to FIG. 1. By way of further example, the transceiver module 910 may enable the mobile device 115-e to transmit data and/or control signals to an access point 105 or another mobile device 115.

In one configuration, the transceiver module 910 may include a modem configured to modulate packets and provide the modulated packets to the antenna(s) 905 for transmission, and to demodulate packets received from the antenna(s) 905. While the mobile device 115-e may include a single antenna, the mobile device 115-e may typically include multiple antennas 905 for multiple links.

The memory 915 may include random access memory (RAM) and read-only memory (ROM). The memory 915 may store computer-readable, computer-executable software code 920 containing instructions that are configured to, when executed, cause the processing module 410-b to perform various functions described herein. Alternatively, the software 920 may not be directly executable by the processing module 410 but be configured to cause the mobile device 115-e (e.g., when compiled and executed) to perform functions described herein.

The processing module 410-b may include an intelligent hardware device, e.g., a central processing unit (CPU), a microcontroller, an application specific integrated circuit (ASIC), etc. The processing module 410-b may include a speech encoder (not shown) configured to receive audio via a microphone, convert the audio into packets (e.g., 30 ms in length) representative of the received audio, provide the audio packets to the transceiver module 910, and provide indications of whether a user is speaking. Alternatively, an encoder may only provide packets to the transceiver module 910, with the provision or withholding/suppression of the packet itself providing the indication of whether a user is speaking. In some embodiments, the processing module 410-b may be an example of one or more aspects of the processing module 410 described with reference to FIGS. 4, 5, 6, 7, and/or 8.

According to the architecture of FIG. 9, the mobile device 115-e may further include a communications management module 925 and a state module 930. The communications management module 925 may manage communications with other mobile devices 115. By way of example, the communications management module 925 may be a component of the mobile device 115-e in communication with some or all of the other components of the mobile device 115-e via a bus. Alternatively, functionality of the communications management module 925 may be implemented as a component of the transceiver module 910, as a computer program product, and/or as one or more controller elements of the processing module 410-b. The state module 930 may reflect and control the current device state (e.g., context, authentication, base station association, other connectivity issues).

The mobile device 115-e may also include an orientation sensor 940, such as an accelerometer or gyroscope, to determine an orientation of the mobile device 115-*e* with respect to a reference (e.g., the earth).

The components of the mobile device 115-*e* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the mobile device 115-*e*.

Figure 10:
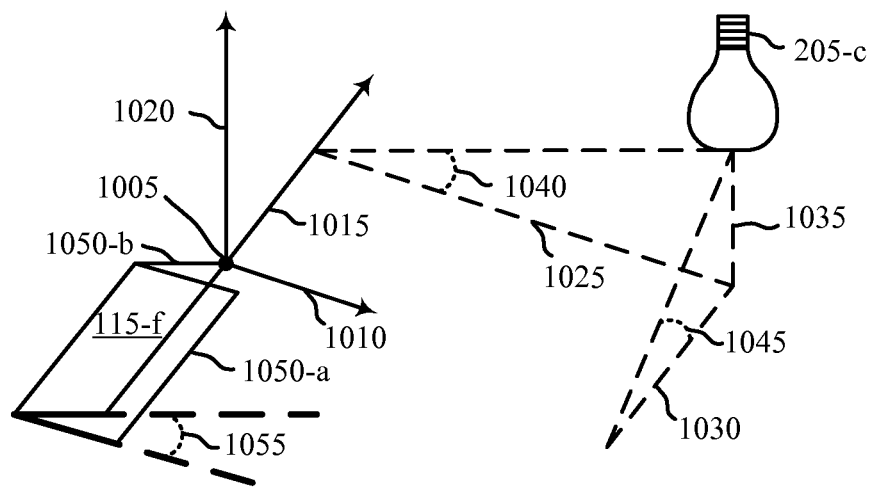
FIG. 10 provides a diagram illustrating an exemplary position of a mobile device with respect to a Cartesian coordinate system in accordance with various embodiments.

FIG. 10 provides a diagram 1000 illustrating an exemplary position 1005 of a mobile device 115-*f*. The position 1005 of the mobile device 115-*f* may be defined at least in part based on the location of a light source 205-*c*. Given a Cartesian reference system having an x-axis 1010, y-axis 1015, and z-axis 1020, the light source 205-*c* may be located a distance 1025 ($d_x$), distance 1030 ($d_y$) and distance 1035 ($d_z$) from the mobile device 115-*f*. The height ($d_z$) of the light source 205-*c* with respect to the mobile device 115-*f* may be defined by a pair of angles 1040, 1045 ($\varphi_x, \varphi_y$) with respect to the x-axis 1010 and the y-axis 1015. The pair of angles 1040, 1045 ($\varphi_x, \varphi_y$) represent an absolute angle of arrival of a light signal received by the mobile device 115-*f* from the light source 205-*c*. The location of the light source 205-*c* may be identified in terms of its height 1035 ($d_z$) with respect to the mobile device 115-*f* (e.g., with respect to the position 1005) and the distances $d_x$ and $d_y$. The distances 1025, 1030 ($d_x, d_y$) may be estimated based on the height 1035 ($d_z$) and the angles 1040, 1045 ($\varphi_x, \varphi_y$) using the previously disclosed equations for the distances 1025, 1030 ($d_x, d_y$).

As shown in FIG. 10, the mobile device 115-*f* may have an orientation 1050-*a* in which its image sensor or the like is aligned squarely with the Cartesian reference system defined by the x-axis 1010, y-axis 1015, and z-axis 1020. However, in some cases, the mobile device 115-*f* may have an orientation 1050-*b* that is rotated with respect to one or more of the axes. By way of example, the illustrated orientation 1050-*b* is rotated with respect to the x-axis 1010 by an angle 1055 ($\theta_x$). When a mobile device 115-*f* is rotated with respect to a position 1005 in the Cartesian reference system, its orientation may be used to determine the absolute angle of arrival of a light signal received by the mobile device 115-*f* from the light source 205-*c*. This is described in greater detail with reference to FIG. 11.

Figure 11:
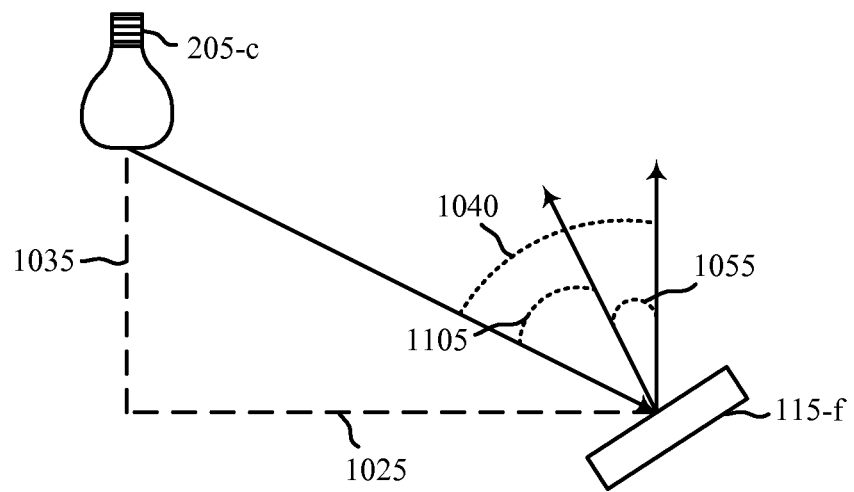
FIG. 11 provides a diagram illustrating an exemplary orientation of a mobile device with respect to an x-axis of a Cartesian coordinate system in accordance with various embodiments.

FIG. 11 provides a diagram 1100 illustrating an exemplary orientation of the mobile device 115-*f* with respect to the x-axis of the Cartesian reference system defined in FIG. 10. In particular, the mobile device 115-*f* may be rotated by an angle 1055 ($\theta_x$) with respect to the x-axis. The angle 1055 ($\theta_x$) may be determined using an orientation sensor of the mobile device 115-*f*, such as an accelerometer or a gyroscope. The angle 1055 ($\theta_x$; i.e., the angle of rotation about the x-axis) may cause the light signal received from the light source 205-*c* to be received by an image sensor of the mobile device 115-*f* at a relative angle of arrival 1105 ($\omega_x$). In such a case, the absolute angle of arrival 1040 ($\varphi_x$) may be obtained using the previously disclosed equation for $\varphi_x$. Similarly, if the mobile device 115-*f* were to be rotated about the y-axis of the Cartesian reference system defined in FIG. 10, the absolute angle of arrival 1045 ($\varphi_y$) may be obtained using the previously disclosed equation for $\varphi_y$.

Figure 12:
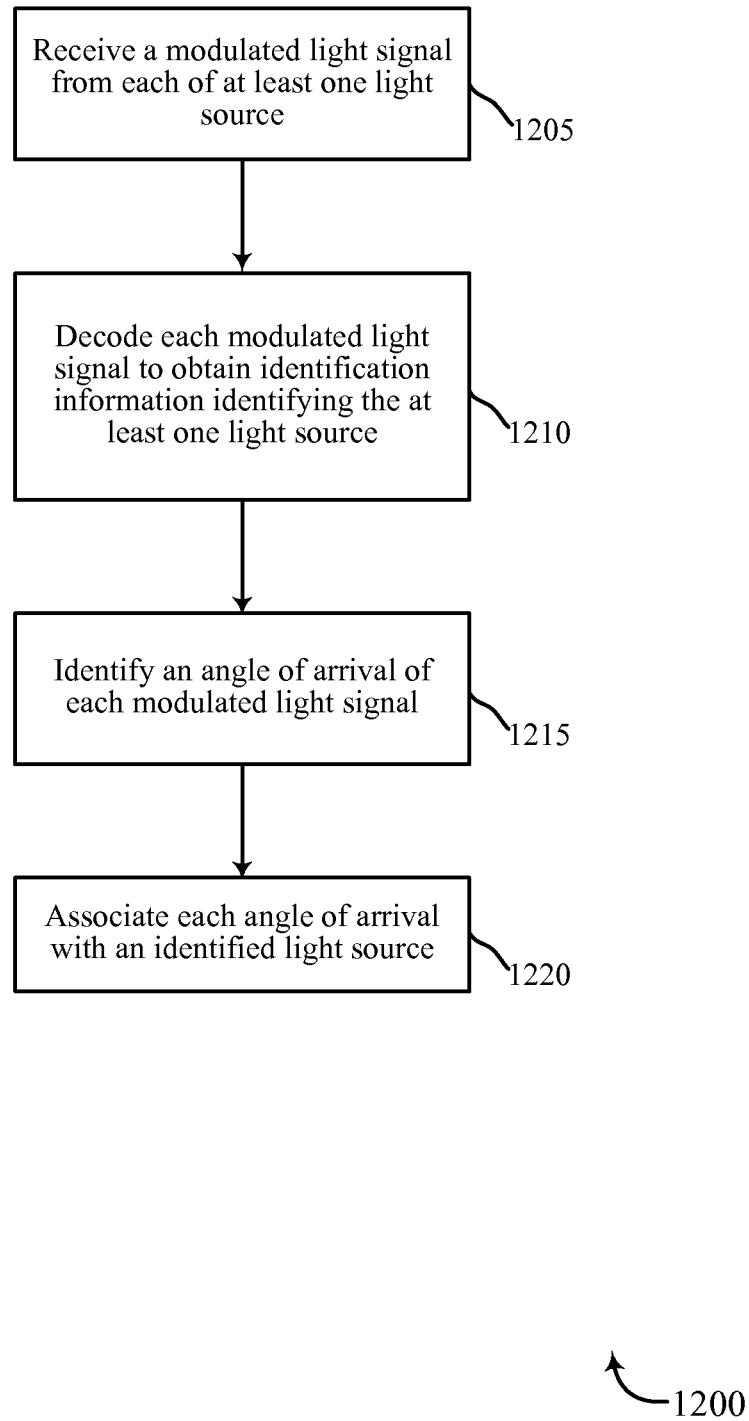
FIG. 12 is a flow chart illustrating a method for determining positioning information of a mobile device using modulated light signals in accordance with various embodiments.

FIG. 12 is a flow chart illustrating a method 1200 for determining positioning information of a mobile device using modulated light signals. For clarity, the method 1200 is described below with reference to one of the light sources 205 described with reference to FIGS. 1, 2, 3, 10, and/or 11. In one implementation, the processing module 410 described with reference to FIGS. 4, 5, 6, 7, 8, and/or 9 may execute one or more sets of codes to control the functional elements of a mobile device 115 to perform the functions described below.

At block 1205, a modulated light signal may be received from each of at least one light source 205. In some embodiments, the modulated light signal(s) may be received using the receiver module 405 described with reference to FIGS. 4 and/or 5 or the image sensor 935 described with reference to FIG. 9. The light signal(s) may in some cases be received by the receiver module 405 or image sensor 935 under control of the processing module 410.

At block 1210, each modulated light signal may be decoded to obtain identification information identifying the at least one light source 205. In some embodiments, the modulated light signal(s) may be decoded using the processing module 410 described with reference to FIGS. 4 and/or 9, the source identification module 505 described with reference to FIG. 5, and/or the decoding module 605 described with reference to FIG. 6.

At block 1215, an angle of arrival of each modulated light signal may be identified. In some embodiments, the angle(s) of arrival may be identified using the processing module 410 described with reference to FIGS. 4 and/or 9 or the angle of arrival identification module 510 described with reference to FIGS. 5 and/or 7.

At block 1220, each angle of arrival may be associated with an identified light source. In some embodiments, the association(s) may be made using the processing module 410 described with reference to FIGS. 4 and/or 9 or the mobile device position determination module 520 described with reference to FIGS. 5 and/or 8.

Therefore, the method 1200 may be used for determining positioning information of a mobile device using modulated light signals. It should be noted that the method 1200 is just one implementation and that the operations of the method 1200 may be rearranged or otherwise modified such that other implementations are possible.

Figure 13:
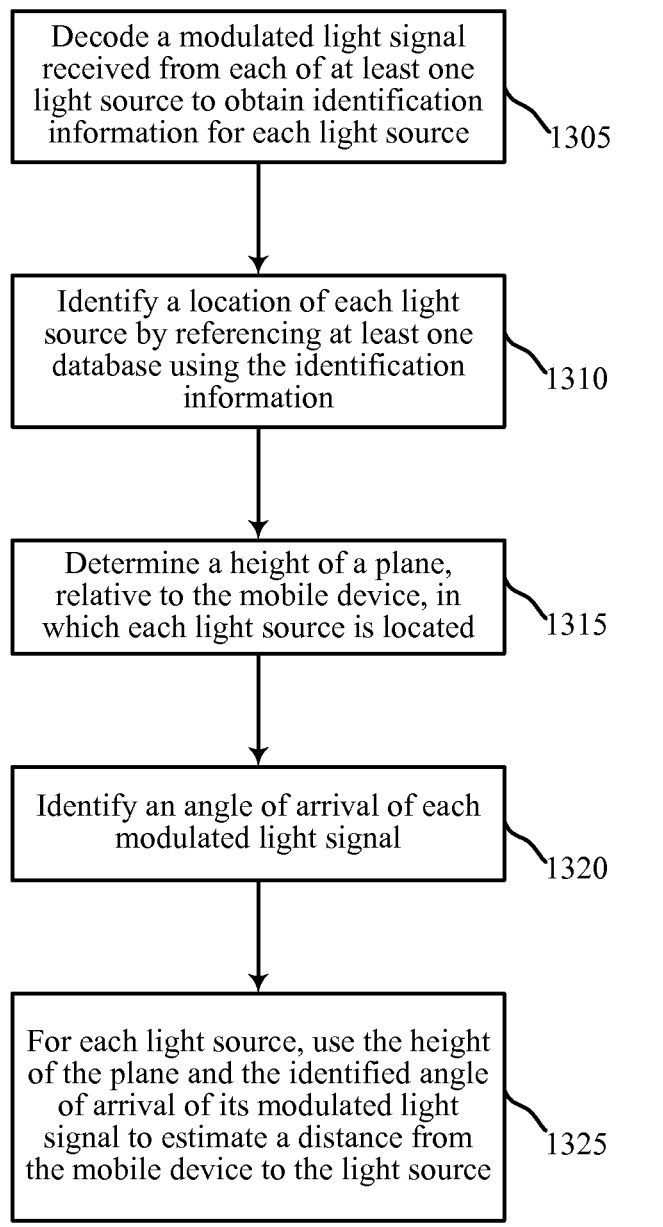
FIG. 13 is a flow chart illustrating another method for determining positioning information of a mobile device using modulated light signals in accordance with various embodiments.

FIG. 13 is a flow chart illustrating another method 1300 for determining positioning information of a mobile device using modulated light signals. For clarity, the method 1300 is described below with reference to one of the light sources 205 described with reference to FIGS. 1, 2, 3, 10, and/or 11. In one implementation, the processing module 410 described with reference to FIGS. 4, 5, 6, 7, 8, and/or 9 may execute one or more sets of codes to control the functional elements of a mobile device 115 to perform the functions described below.

At block 1305, a modulated light signal received from each of at least one light source 205 may be decoded to obtain identification information for each light source 205. In some embodiments, the modulated light signal(s) may be received using the receiver module 405 and/or processing module 410 described with reference to FIGS. 4 and/or 5, or the image sensor 935 and/or processing module 410-*b* described with reference to FIG. 9. In some cases, the light signal(s) may be received by the receiver module 405 or image sensor 935 under control of the processing module 410. The light signal(s) may be decoded, for example, using a decoding module such as the decoding module 605 described with reference to FIG. 6 or the image sensor 935 (e.g., a CMOS image sensor) and/or processing module 410-*b* described with reference to FIG. 9.

At block 1310, a location of each light source may be identified by referencing at least one database using the identification information obtained by decoding the modulated light signal(s). In some embodiments, the location(s) may be identified using the processing module 410 described with reference to FIGS. 4 and/or 9 or the source location determination module 515 described with reference to FIGS. 5 and/or 6. In some cases, the at least one database may be accessed using the lookup module 610 described with reference to FIG. 6.

At block 1315, a height of a plane, relative to the mobile device, in which each light source is located may be determined. By way of example, each modulated light signal may be received using an image sensor, and the height of the plane may be determined by measuring a distance in pixels between two illuminated regions captured by the image sensor (with the two illuminated regions corresponding to two light sources). The measured distance may then be compared to a known distance between the two light sources. The known distance may be obtained, for example, from a database. In some embodiments, the height of the plane may be identified using the processing module 410 described with reference to FIGS. 4, 5, and/or 9 or the height identification module 805 described with reference to FIG. 8.

At block 1320, an angle of arrival of each modulated light signal may be identified. In some embodiments, the angle(s) of arrival may be identified using the processing module 410 described with reference to FIGS. 4 and/or 9 or the angle of arrival identification module 510 described with reference to FIGS. 5 and/or 7. The angle of arrival of each modulated light signal may also be identified using an image sensor, such as the image sensor 935 described with reference to FIG. 9. For example, the angle of arrival of each modulated light signal may be identified based on information extrapolated from an image obtained from a CMOS image sensor (e.g., by determining a position of an illuminated region captured by the image sensor, where the position may be specified in terms of pixel indices of the image sensor). The angle of arrival of each light signal may also be identified based on an orientation of the mobile device 115, as described with reference to FIGS. 10 and/or 11.

At block 1325, positioning information may be determined based at least in part on the identified location of each light source 205 and the identified angle of arrival of each modulated light signal. In some cases, and as shown in FIG. 13, determining the positioning information may include estimating a distance from the mobile device 115 to each of the at least one light source 205 (or estimating the distance from the mobile device 115 to at least one of the light sources 205). The distance from the mobile device 115 to a given light source may be estimated, for example, using the height of the plane determined at block 1315 and the identified angle of arrival of the light signal received from the light source 205 (determined at block 1320). In some embodiments, the positioning information may be determined using the processing module 410 described with reference to FIGS. 4 and/or 9 or the mobile device position determination module 520 described with reference to FIGS. 5 and/or 8. The distance from the mobile device 115 to a light source may in some cases be estimated using the distance estimation module 810.

Therefore, the method 1300 may be used for determining positioning information of a mobile device using modulated light signals. It should be noted that the method 1300 is just one implementation and that the operations of the method 1300 may be rearranged or otherwise modified such that other implementations are possible.

Figure 14:
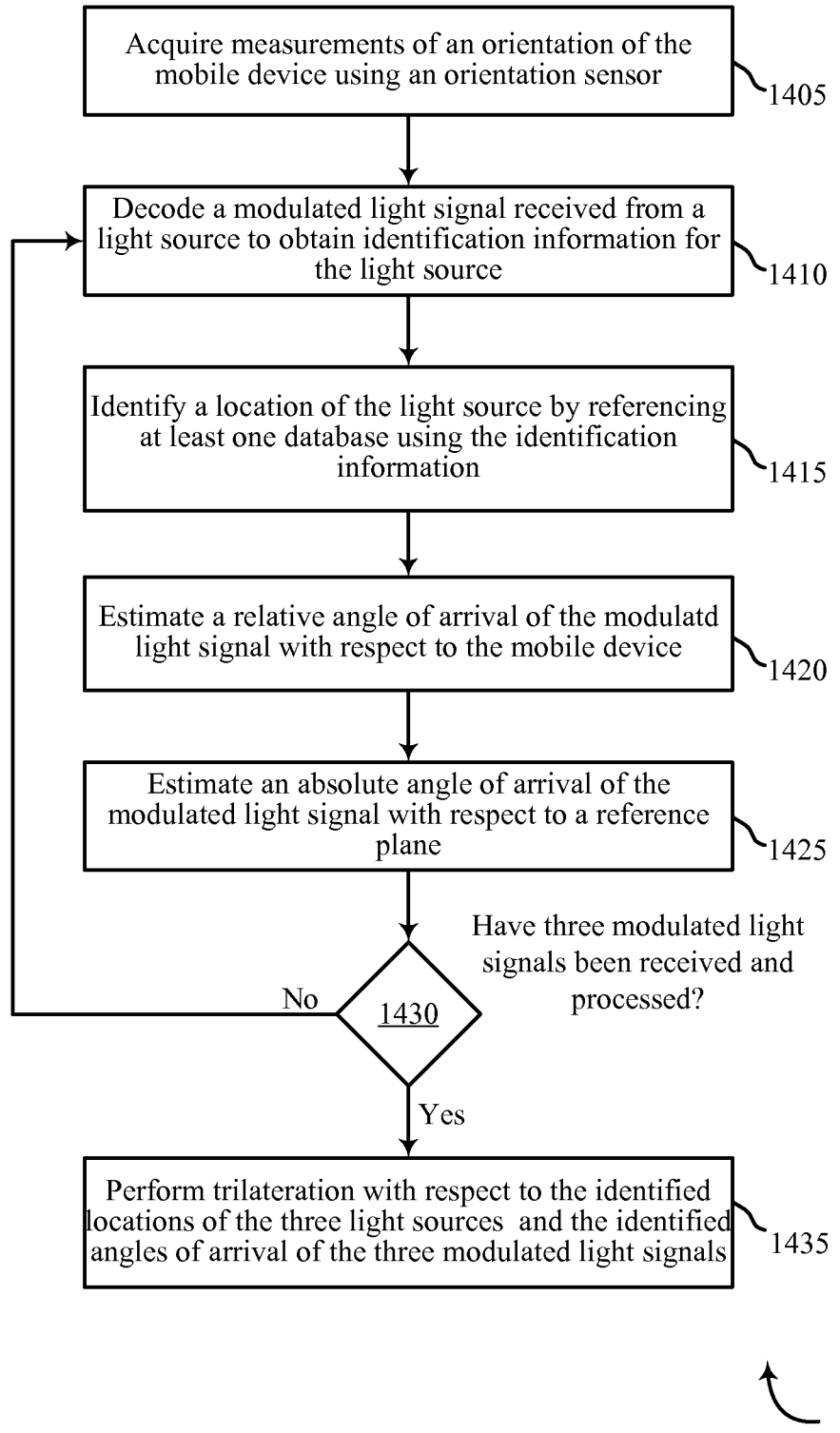
FIG. 14 is a flow chart illustrating yet another method for determining positioning information of a mobile device using modulated light signals in accordance with various embodiments.

FIG. 14 is a flow chart illustrating another method 1400 for determining positioning information of a mobile device using light signals. For clarity, the method 1400 is described below with reference to one of the light sources 205 described with reference to FIGS. 1, 2, 3, 10, and/or 11. In one implementation, the processing module 410 described with reference to FIGS. 4, 5, 6, 7, 8, and/or 9 may execute one or more sets of codes to control the functional elements of a mobile device 115 to perform the functions described below.

At block 1405, measurement of an orientation of the mobile device 115 may be acquired using an orientation sensor. The orientation sensor may in some cases include a gyroscope or accelerometer. In some embodiments, the measurements may be acquired using the receiver module 405 and/or processing module 410 described with reference to FIG. 4, the angle of arrival identification module 510 described with reference to FIG. 5, the orientation determination module 710 described with reference to FIG. 7, or the orientation sensor 940 and/or processing module 410 described with reference to FIG. 9.

At block 1410, a modulated light signal received from a light source 205 may be decoded to obtain identification information for the light source. In some embodiments, the light signal may be received using the receiver module 405 and/or processing module 410 described with reference to FIGS. 4, and/or 5 or the image sensor 935 and/or processing module 410 described with reference to FIG. 9. In some cases, the light signal may be received by the receiver module 405 or image sensor 935 under control of the processing module 410. The light signal may be decoded, for example, using a decoding module such as the decoding module 605 described with reference to FIG. 6 or the image sensor 935 (e.g., a CMOS image sensor) and/or processing module 410 described with reference to FIG. 9.

At block 1415, a location of the light source may be identified by referencing at least one database using the identification information obtained by decoding the modulated light signal. In some embodiments, the location may be identified using the processing module 410 described with reference to FIGS. 4 and/or 9 or the source location determination module 515 described with reference to FIGS. 5 and/or 6. In some cases, the at least one database may be accessed using the lookup module 610 described with reference to FIG. 6.

At blocks 1420 and 1425, an angle of arrival of the modulated light signal may be identified. The angle of arrival may be identified by first estimating a relative angle of arrival of the modulated light signal with respect to a coordinate system of the mobile device 115 at block 1420. An absolute angle of arrival of the light signal with respect to an absolute coordinate system may then be identified at block 1425, based at least in part on 1) the acquired measurements of the orientation of the mobile device 115, and 2) the relative angle of arrival of the modulated light signal. The estimation of the relative and absolute angles of arrival of the modulated light signal may in some cases be undertaken as described with reference to FIG. 11. In some embodiments, the angle of arrival may be identified using the processing module 410 described with reference to FIGS. 4 and/or 9 or the angle of arrival identification module 510 described with reference to FIGS. 5 and/or 7. The angle of arrival of the modulated light signal may also be identified using an image sensor. For example, in some cases the angle of arrival of the modulated light signal may be identified based on information extrapolated from an image obtained from a CMOS image sensor.

At block 1430, it may be determined whether three modulated light signals have been received and processed at blocks 1410, 1415, 1420, and 1425. If not, the operations at blocks 1410, 1415, 1420, and 1425 may be repeated for another modulated light signal received from another light source 205. If so, the method 1400 may proceed to block 1435.

At block 1435, positioning information may be determined based at least in part on the identified location of each light source 205 and the identified angle of arrival of each modulated light signal. In some cases, and as shown in FIG. 14, determining the positioning information may include performing trilateration with respect to the identified locations of the three light sources 205 and the identified angles of arrival of the three modulated light signals received from the three light sources 205. The trilateration may include estimating a distance from the mobile device 115 to each of the light sources 205. The distance from the mobile device 115 to a given light source may be estimated, for example, as described with reference to FIG. 13. In some embodiments, the positioning information may be determined using the processing module 410 described with reference to FIGS. 4 and/or 9 or the mobile device position determination module 520 described with reference to FIGS. 5 and/or 8.

Therefore, the method 1400 may be used for determining positioning information of a mobile device using modulated light signals. It should be noted that the method 1400 is just one implementation and that the operations of the method 1400 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for determining positioning information of a mobile device using modulated light signals, comprising:
   receiving, at the mobile device, a modulated light signal from each of at least two light sources;
   decoding, by the mobile device, each modulated light signal to obtain identification information identifying the at least two light sources;
   estimating, by the mobile device, a relative angle of arrival of each modulated light signal with respect to a coordinate system of the mobile device;
   acquiring, at the mobile device, measurements of an orientation of the mobile device using an orientation sensor;
   estimating, by the mobile device, an absolute angle of arrival of each modulated light signal with respect to an absolute coordinate system based at least in part on the acquired measurements and the relative angle of arrival;
   measuring the distance between two illuminated regions captured by an image sensor of the mobile device, the two illuminated regions corresponding to at least the at least two light sources in a horizontal plane vertically removed from the mobile device having a known distance between the at least two light sources;
   estimating, a height from the mobile device of each of the at least two light sources based at least in part on the measured distance and the known distance between the at least two light sources;
   estimating distances, in three dimensions, from the mobile device to each of the at least two lights sources based at least in part on the absolute angle of arrival of each respective modulated light signal and the estimated height;
   identifying a location of each of the at least two light sources; and
   determining, by the mobile device, a position of the mobile device based at least in part on the identified location of each of the at least two light sources and the estimated distances.

2. The method of claim 1, wherein identifying the location of each of the at least two light sources comprises:
   referencing at least one database using the identification information, to identify the location of each of the at least two light sources.

3. The method of claim 1, wherein:
   the modulated light signals are decoded using the image sensor.

4. The method of claim 1, wherein:
   the relative angle of arrival of each modulated light signal is identified using the image sensor.

5. The method of claim 1, wherein estimating the relative angle of arrival of each modulated light signal comprises:
   determining, by the mobile device, a position of an illuminated region captured by the image sensor, the position specified in terms of pixel indices.

6. The method of claim 1, further comprising:
   determining a position of the mobile device based at least in part on the identified location of each light source and the estimated absolute angle of arrival of each modulated light signal.

7. The method of claim 1, wherein estimating the distance from the mobile device to each of the at least two light sources comprises:
   determining a height of a plane, relative to the mobile device, in which the at least two light sources are located; and
   using the height and the absolute angle of arrival of the modulated light signal received from the at least two light sources to estimate the distance from the mobile device to the at least two light sources.

8. The method of claim 7, wherein each modulated light signal is received using the image sensor, and wherein determining the height of the plane comprises:
   measuring a distance in pixels between the two illuminated regions captured by the image sensor; and
   comparing the measured distance to a known distance between the at least two light sources.

9. The method of claim 8, further comprising:
   obtaining the known distance between the at least two light sources from a database.

10. The method of claim 1, wherein the coordinate system of the mobile device is based at least in part on a vector perpendicular to a plane parallel to an array of photodiodes of the image sensor.

11. The method of claim 1, wherein the orientation sensor comprises a gyroscope or an accelerometer.

12. The method of claim 1, wherein determining the position of the mobile device comprises:
performing trilateration with respect to identified locations of three light sources and absolute angles of arrival of three modulated light signals received from the three light sources.

13. The method of claim 1, wherein the at least two light sources comprises a light emitting diode (LED) luminaire.

14. The method of claim 1, wherein each modulated light signal comprises a visible light communication (VLC) signal or an infrared signal.

15. Apparatus for determining positioning information using modulated light signals, comprising:
a processor;
memory in electronic communication with the processor; and
instructions stored in the memory, the instructions being executable by the processor to:
receive, at a mobile device, a modulated light signal from each of at least two light sources;
decode, by the mobile device, each modulated light signal to obtain identification information identifying the at least two light sources;
estimate, by the mobile device, a relative angle of arrival of each modulated light signal with respect to a coordinate system of the mobile device;
acquire, at the mobile device, measurements of an orientation of the mobile device using an orientation sensor;
estimate, by the mobile device, an absolute angle of arrival of each modulated light signal with respect to an absolute coordinate system based at least in part on the acquired measurements and the relative angle of arrival;
measure the distance between two illuminated regions captured by an image sensor of the mobile device, the two illuminated regions corresponding to at least the at least two light sources in a horizontal plane vertically removed from the mobile device having a known distance between the at least two light sources;
estimate, a height from the mobile device of each of the at least two light sources based at least in part on the measured distance and the known distance between the at least two light sources;
estimate distances, in three dimensions, from the mobile device to each of the at least two lights sources based at least in part on the absolute angle of arrival of each respective modulated light signal and the estimated height;
identify a location of each of the at least two light sources; and
determine, by the mobile device, a position of the mobile device based at least in part on the identified location of each of the at least two light sources and the estimated distances.

16. The apparatus of claim 15, wherein the instructions are executable by the processor to:
reference at least one database using the identification information, to identify the location of each of the at least two light sources.

17. The apparatus of claim 15, wherein:
the modulated light signals are decoded using the image sensor.

18. The apparatus of claim 15, wherein estimating the relative angle of arrival of each modulated light signal comprises:
determining, by the mobile device, a position of an illuminated region captured by the image sensor, the position specified in terms of pixel indices.

19. The apparatus of claim 15, wherein the instructions are executable by the processor to:
determine a position of the mobile device based at least in part on the identified location of each light source and the estimated absolute angle of arrival of each modulated light signal.

20. The apparatus of claim 15, wherein the instructions are executable by the processor to:
determine a height of a plane, relative to the mobile device, in which the at least two light sources are located; and
use the height and the absolute angle of arrival of the modulated light signal received from the at least two light sources to estimate the distance from the mobile device to the at least two light sources.

21. The apparatus of claim 20, wherein the instructions are executable by the processor to:
receive the modulated light signal from each of the at least one light source using the image sensor;
measure a distance in pixels between the two illuminated regions captured by the image sensor; and
compare the measured distance to a known distance between the at least two light sources.

22. The apparatus of claim 21, wherein the instructions are executable by the processor to:
obtain the known distance between the at least two light sources from a database.

23. The apparatus of claim 15, wherein the coordinate system of the mobile device is based at least in part on a vector perpendicular to a plane parallel to an array of photodiodes of the image sensor.

24. The apparatus of claim 15, wherein the orientation sensor comprises a gyroscope or an accelerometer.

25. The apparatus of claim 15, wherein the instructions are executable by the processor to:
perform trilateration with respect to identified locations of three light sources and absolute angles of arrival of three modulated light signals received from the three light sources.

26. The apparatus of claim 15, wherein the at least two light sources comprises a light emitting diode (LED) luminaire.

27. The apparatus of claim 15, wherein each modulated light signal comprises a visible light communication (VLC) signal or an infrared signal.

28. A computer program product for determining positioning information of a mobile device using modulated light signals, the computer program product comprising a non-transitory computer-readable medium storing instructions executable by a processor to:
receive, at the mobile device, a modulated light signal from each of at least two light sources;
decode, by the mobile device, each modulated light signal to obtain identification information identifying the at least two light sources;
estimate, by the mobile device, a relative angle of arrival of each modulated light signal with respect to a coordinate system of the mobile device;
acquire, at the mobile device, measurements of an orientation of the mobile device using an orientation sensor;
estimate, by the mobile device, an absolute angle of arrival of each modulated light signal with respect to an absolute coordinate system based at least in part on the acquired measurements and the relative angle of arrival;

measure the distance between two illuminated regions captured by an image sensor of the mobile device, the two illuminated regions corresponding to at least the at least two light sources in a horizontal plane vertically removed from the mobile device having a known distance between the at least two light sources;

estimate, a height from the mobile device of each of the at least two light sources based at least in part on the measured distance and the known distance between the at least two light sources;

estimate distances, in three dimensions, from the mobile device to each of the at least two lights sources based at least in part on the absolute angle of arrival of each respective modulated light signal and the estimated height;

identify a location of each of the at least two light sources; and determine, by the mobile device, a position of the mobile device based at least in part on the identified location of each of the at least two light sources and the estimated distances.

29. The computer program product of claim 28, wherein the instructions are executable by the processor to:

determine a position of the mobile device based at least in part on the identified location of each light source and the estimated angle of arrival of each modulated light signal.

30. The computer program product of claim 28, wherein the instructions are executable by the processor to:

perform trilateration with respect to identified locations of three light sources and absolute angles of arrival of three modulated light signals received from the three light sources.

* * * * *